United States Patent [19]

Redlich et al.

[11] 3,737,589

[45] June 5, 1973

[54] RECORDING MECHANICALLY REPRODUCIBLE HIGH FREQUENCY SIGNALS ON RECORDING CARRIERS

[75] Inventors: Horst Redlich, Hans-Joachim Klemp, both of Berlin, Germany

[73] Assignee: Teldec Telefunken-Decca Schallplatten G.m.b.H., Hamburg, Germany

[22] Filed: Aug. 2, 1971

[21] Appl. No.: 168,073

[30] Foreign Application Priority Data

Aug. 1, 1970 Germany....................P 20 38 453.6

[52] U.S. Cl..179/100.3 A, 178/6.7 A, 179/100.3 V, 179/100.4 C

[51] Int. Cl...........................G11b 11/06, H04n 5/86

[58] Field of Search................179/100.3 A, 100.3 V, 179/100.4 C; 178/6.6 TP, 6.6 A, 6.6 DD, 6.7 R, 6.7 A; 346/77 F; 96/1.1; 340/173 CA, 173 TP

[56] References Cited

UNITED STATES PATENTS

| | | | |
|---|---|---|---|
| 2,477,640 | 8/1949 | Montague | 179/100.3 A |
| 3,175,196 | 3/1965 | Lee et al. | 178/6.6 TP |
| 3,138,669 | 6/1964 | Rabinow et al. | 179/100.3 A |

OTHER PUBLICATIONS

Electron Beam Recording, Ampex Readout, Vol. 5, No. 2, 1966, pp. 10–13.

*Primary Examiner*—Raymond F. Cardillo, Jr.
*Attorney*—George H. Spencer

[57] ABSTRACT

A method of recording mechanically reproducable high frequency signals on a record disc by applying to a carrier disc a beam which will result in the removal of material from the disc, causing the beam to describe a spiral path on the disc, deflecting the beam, alternatingly transverse to the path at a rate which is a multiple of the signal being recorded and simultaneously modulating the beam intensity with such signal and with a signal whose frequency is twice that of the beam deflection rate.

10 Claims, 5 Drawing Figures

$f_A = 15$ MHz $f_A = 15$ MHz
$f_i = 2 \times f_A = 30$ MHz

RECORDING MECHANICALLY REPRODUCIBLE HIGH FREQUENCY SIGNALS ON RECORDING CARRIERS

BACKGROUND OF THE INVENTION

It is already known in the art to record high frequency signals, particularly video signals, on mechanical record carriers, e.g. disc-shaped carriers, or picture records. The recording of moving images is generally made with the carrier moving at a speed substantially lower than the subsequent playback scanning speed. The time thus required for making the recording therefore often proves unacceptable.

When a single television picture frame is recorded on a magnetic foil carrier, it is known to make the recording speed equal to the scanning speed. This is not done to save time. The saving in time is of no importance in the recording of an individual picture frame.

It is also known, as disclosed in German DAS No. 1,045,116 to record signals on photosensitive materials by means of an electron beam or a laser beam. In these known methods the diameter of the beam is equal to the width of the record groove. This permits only recordings whose wavelength is a multiple of the groove width. This means that only relatively low frequencies, or long wavelengths, can be recorded. These methods cannot be employed for recording video signals.

The possibility of producing a high storage density in a recording by means of a laser beam has also been utilized. It is known, in this connection, to burn a hole having a diameter of the order of a micron into a nonmagnetic tape by means of laser beams for purposes of data storage, a hole representing a "1," no hole representing a "0." This method cannot be used for the purpose of recording moving television pictures.

SUMMARY OF THE INVENTION

It is the object of the present invention to avoid, during recording of moving images on disc or tape shaped recording carriers on which the signal is stored in the form of spatial deformations of the carrier surface, the above-mentioned disadvantages, particularly the long recording times.

A further object of the invention is to provide a signal carrier which lends itself to simple mechanical duplication in the manner employed for phonograph records or which can be directly mechanically scanned, the wavelength of the recorded signals being smaller than the groove width.

These objects are accomplished according to the present invention by employing an electron or laser beam to record the high frequency signals on the recording carrier, and by causing the beam to form a cutting edge or to permit a subsequent material removal operation.

It should here additionally be noted that it is known to record video signals on a tape-type carrier by means of a laser beam and to then produce copies of this carrier, the carrier material having a vinyl base.

DESCRIPTION OF THE PREFERRED EMBODIMENTS

Figure 1:
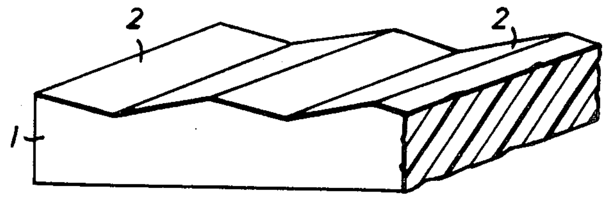
FIG. 1 is a perspective sectional view of a picture disc provided with grooves but no information.

In FIG. 1, the disc-shaped signal carrier 1 is provided with grooves 2 which are to contain the deformations representing the video signals. The approximately V-shaped grooves are very flat and narrow and have a depth of approximately 1$\mu$ and a width of approximately 7$\mu$. The recording would take the form of deformations similar to the hill-and-dale undulations employed in sound recordings.

Figure 2A:
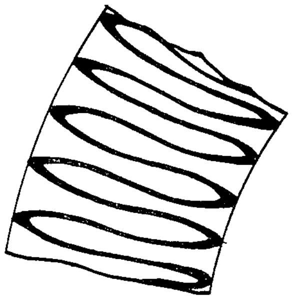
FIGS. 2*a* and 2*b* are pictorial plan views illustrating the recording method of the invention.
Figure 2B:
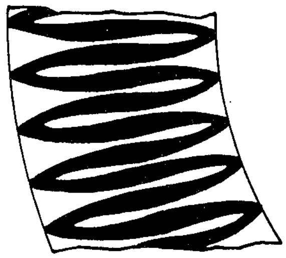

FIGS. 2*a* and 2*b* show how the carrier is provided with recordings. The carrier is sensitized, for example, designed as a disc with an appropriately sensitive layer, in such a manner that an electron or laser beam which is modulated with video signals, and possibly also with additional signals, can produce the appropriate physical, or spatial, deformations. It is also possible to employ a carrier having a photosensitive layer where the varying intensity of the electron or laser beam, which corresponds to the information to be recorded effects varying degrees of darkening. These embodiments require that the beam have a very narrow diameter, i.e. less than 1$\mu$.

In order for the beam to act as a cutting surface, it is deflected transverse to the record groove axis by an amount equal to the desired groove width at a multiple of, e.g. 5 times, the signal frequency $f_s$ which is approximately 3 MHz. For example, the deflection frequency $f_A$ could be 15 MHz as shown in FIG. 2*a*. This initially assures that the groove width is established by the beam as with a mechanical cutter. As shown in FIG. 2*b*, for the groove to be deepest in the center, the intensity of the beam must be modulated sufficiently at a frequency $2 \times f_A = f_i$, i.e. approximately 30 MHz, and with the appropriate phase, so that the effect of the beam is greatest along the center of the groove and least along the groove edges. This produces an approximately V-shaped groove after the beam has traversed and attacked a strip of material, as shown in FIG. 1, or a darkened strip whose different degrees of darkening correspond to the different depths of the approximately V-shaped groove.

Onto the intensity modulated, groove shaping component with the frequency $f_i$, there is additively superimposed the information signal with the frequency $f_s$, so that a hill-and-dale recording of the information signal is produced. As a result of the additive superposition the recorded and engraved amplitude of the information signal is constant across the groove width. Thus the produced groove has a shape like a mechanically cut groove.

As the material for the carrier surface originally subjected to the electron or laser beam, from which carrier a nickel master may be produced, a photoresist may be employed. The electron beam as well as the laser beam softens the photoresist by an amount corresponding to the beam intensity. After recording, the carrier surface will be developed for example by treating it with sodium hydroxide, which removes the softer portions leaving a hill-and-dale pattern of the carrier surface.

This method is well known (see e.g. Electronics, November 10th, 1969 page 111).

There are known also other types of photoresist-like materials employed for example for the production of printed circuits. These materials, which may have the form of a lacquer layer at the surface of a plastic foil, polymerize when subjected to ultraviolet light or other suitable radiation. After polymerization they are - depending upon the intensity of the light to which the materials where subjected - more or less insoluble. Such a material is sold under the trade name "Nyloprint" by the firm "Badische Anilin und Sodafabriken" (BASF) of Ludwigshafen/Germany. The manner of removing the unpolymerized material from the polymerized material is well known and described by "BASF" in their instructions for use of "Nyloprint", as well as in the corresponding instructions for other similar materials.

"Nyloprint" or similar materials may be used as a layer at the surface of a carrier which is produced as a photograph is produced by exposure through a negative laid over the photograph.

As the negative, a negative photographic foil may be used which has been exposed by the electron or laser beam intensity-modulated with the information signal ($f_s$) and a frequency $2 \times f_A = f_i$ and deflected at the frequency $f_A$ according to the invention. The exposure and development of the negative photographic foil, well known in photography will cause varying degrees of darkening. By exposure of the carrier surface, of "Nyloprint" for example, by means of shortwave light penetrating the transparent parts of the developed negative foil, the carrier surface will polymerize and become unsoluble under those parts of the negative foil which are not or less darkened than at the centers of the tracks. Then the unpolymerized center parts of the track may be removed in a bath of alcohol, for example, wherein the unpolymerized parts of the carrier surface become dissolved.

Thus a groove with a depth of about 1 $\mu$ and hill-and-dale deformations with a depth of about ½ $\mu$ will be produced, which deformations correspond to the information signal.

The grooves produced by the method corresponding to the invention need not at all have the ideal shape of FIG. 1. If the intensity modulation of the beam with the frequency $f_i$ occurs with a sinusoidal waveform the cross section of the grooves will have the shape of a cosinusoidal waveform. If another cross section is wanted, another waveform for the intensity modulation $f_i$ must be used, for example the waveform of an inversed full-wave rectified sinusoidal undulation, the phase of which waveform must be such that the inverted peaks between two successive half sine waves of the waveform produce the maximum intensity of the beam in the centerline of the groove.

The diameter of the beam is preferably large enough to ensure that adjacent traces of it will overlap one another so that there is no essential modulation of the groove walls in their longitudinal direction with the frequency $f_A$ or $f_i$ but only an essential modulation with the information signal of frequency $f_s$.

It may also be mentioned that the waveform of the deflection undulation with the frequency $f_A$ has not necessary to have a sinusoidal shape. Preferably a triangular pulse may be used.

Figure 3:
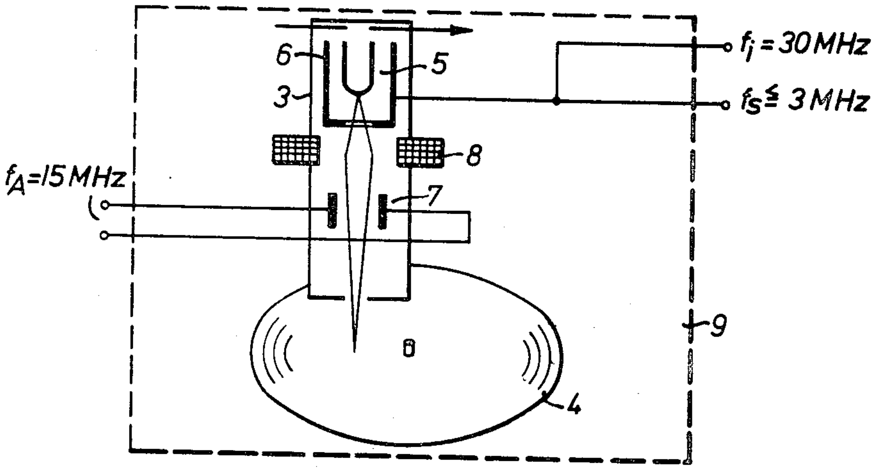
FIG. 3 is a simplified pictorial view of the basic parts of a recording device for making a recording according to the invention, operating with an electron beam.

FIG. 3 shows the basic components of an embodiment of a recording device operating with an electron beam according to the invention. The recording device 3 which is moved radially across the recording carrier 4 during recording, as indicated by the arrow, is accommodated in an airtight housing 9 maintained under a vacuum of approximately $10^{-5}$ torr. The recording carrier 4 is, for example, a sensitized plastic disc or a disc covered with a photosensitive layer.

The electron beam emanating from cathode 5 is modulated by means of a Wehnelt cylinder 6 by the information signal having a frequency $f_s$ of approximately 3 MHz and by an intensity modulation signal at a frequency $f_i$ of approximately 30 MHz (both of these signals being fed to cylinder 6). The transverse deflection signal at a frequency $f_A$ of approximately 15 MHz, which is equal to one-half the intensity modulation frequency $f_i$, is applied to electrostatic deflection plates 7 to produce the desired recorded strip width. The electron optics 8 serve to focus the beam on carrier 4.

If there is used, for the recording carrier, a photosensitive layer which exhibits, after the recording process, differing degrees of darkening corresponding to the desired transverse profile of the strip and the information signal, this "negative" can be duplicated in a contact copying process. A sensitive carrier for the copy could be a photosensitive lacquer which is applied to a substrate and which is illuminated by shortwave, e.g. ultraviolet, light which penetrates the negative. At the exposed portions, corresponding to the undarkened portion of the negative, the lacquer is polymerized and insoluble. The unexposed portions, corresponding to the darkened portions of the negative, can then be removed so that the profile according to FIG. 1 again results. Of course, the portions corresponding to partially darkened portions of the negative will be removed to a depth corresponding to the degree of darkening. Instead of the lacquer it is also possible to use a homogeneous plastic carrier which can be polymerized by irradiation.

Figure 4:
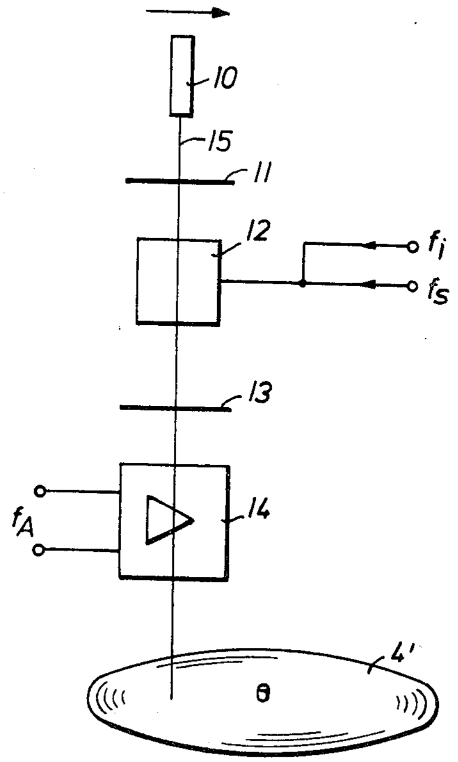
FIG. 4 is a simplified pictorial view of the basic parts of a recording device for making a record according to the invention using a laser beam.

FIG. 4 shows the basic components of an embodiment of a recording device operating with a laser beam according to the invention. The laser 10 is moved radially accross the recording carrier 4' during recording, as indicated by the arrow. The laser beam 15 penetrates a first polarization filter 11 and then has a fixed direction of polarization. The beam then penetrates a Kerr cell 12 by which the direction of polarization is varied in accordance with the voltage applied to its electrodes. The voltage consists of two oscillations with the frequencies $f_s$ and $f_i$ fed to the Kerr cell. The laser beam 15 with its direction of polarization varied according to the information signal and the signal of frequency $f_i$ then penetrates a second polarization filter 13 the direction of polarization of which is perpendicular to that of the first filter 11. Thus the beam 15 becomes intensity modulated by filters 11 and 13 and the Kerr cell 12 in a well known manner.

The beam 15, now intensity modulated, further penetrates an electro-optical deflection system 14 with an optical prism the refractive index of which is varied by the transverse deflection signal applied thereto with the frequency $f_A$. Electro-optical deflection systems are known (see e.g. "Zeitschrift fur Datenverarbeitung," 1969, page 192, and "Funkschau" 1970, number 24, page 834). It is also known to use the so called "Pockels-Effect" for electro-optical deflection systems.

A cutting-edge beam of the type required for the new process can also be obtained by the appropriate design of apertures and electron optics or by devices corresponding to optical gray wedges, but the resulting energy losses will often be prohibitive. Moreover, in the latter recording processes, contrary to the above-mentioned methods, the recorded amplitude is not constant over the entire groove width, which however is of subordinate significance for certain types of application, for example when only the bottom, or center, portion of the groove is being scanned.

A signal carrier which has been produced in the above described manner at the normal playback scanning speed can be used without difficulty directly for playback or as a master for matrixes for duplication by pressing.

Thus the invention utilizes the advantages of recording with a small area beam while directly providing a recording track of sufficient width to be mechanically scanned by a playback transducer.

It will be understood that the above description of the present invention is susceptible to various modifications, changes and adaptations, and the same are intended to be comprehended within the meaning and range of equivalents of the appended claims.

We claim:

1. A method for producing a mechanically reproducible recording of a high frequency signal along a recording track comprising the steps of:

providing a recording carrier at least one surface of which is of a material capable of being modified in a detectable manner as a result of being struck by a beam of a particular type, the degree of modification at each point being a function of the beam intensity at that point;

directing against such surface a beam of such particular type and causing the beam to have a small area at such surface which area is not essentially larger than the width of the recording track and which in the longitudinal direction of the track is smaller than the track width;

moving the surface relative to the beam for causing the beam to trace the recording track on the surface, which track has its greatest modification in its center, while modulating the intensity of the beam with the signal to be recorded; and during said step of moving, cyclically deflecting the beam in alternately opposite directions transverse to the recording track and parallel to the carrier surface at a frequency which is a multiple of the frequency of the signal to be recorded, and additionally modulating the intensity of the beam at a frequency which is double the deflecting frequency to cause the resulting beam intensity to vary between maximum and minimum extreme values and to have one of its extreme values when the beam is at the center of the recording track and the other of its extreme values when the beam is at the edges of the track.

2. A method as defined in claim 1 wherein the beam is of the laser type.

3. A method as defined in claim 1 wherein the beam is an electron beam.

4. A method as defined in claim 1 wherein said carrier material is photosensitive and comprising the further steps of producing a photographic copy of the recorded surface and removing portions of the copy surface corresponding to those carrier surface portions struck by the beam.

5. A method as defined in claim 1, wherein said step of additionally modulating the intensity of the beam at a frequency which is double the deflecting frequency is carried out so as to cause the beam intensity to be greatest at the center of the recording track and least at the edges thereof thereby to cause the resulting recording track to be in the form of a groove which slopes downwardly from its edges to its center.

6. A method as defined in claim 1 wherein the carrier material is a plastic.

7. A method as defined in claim 1 wherein the carrier is initially transparent and is of a material which becomes modified by being darkened in response to the particular type of beam.

8. A method as defined in claim 7 comprising the further step of producing a negative copy of the recorded carrier.

9. A method as defined in claim 8 wherein said step of producing is carried out by directing ultraviolet light through the recorded carrier onto a copy blank at least one surface of which is a material which is polymerized to become insoluble by exposure to such light.

10. Apparatus for producing a mechanically reproducible recording of a high frequency signal along a recording track on one surface of a recording carrier, which surface is of a material capable of being modified in a detectable manner as a result of being struck by a beam of a particular type, the degree of modification at each point on such surface being a function of the beam intensity at that point, said apparatus comprising, in combination:

means for producing a beam of such particular type and for directing said beam against such carrier surface while causing said beam to have, at such surface, an area not essentially larger than the width of the recording track and a dimension in the longitudinal direction of the track smaller than the track width;

means for supporting the carrier so that such surface is struck by the beam and for moving the surface relative to the beam for causing the beam to trace the recording track on the surface;

deflection means disposed for cyclically deflecting the beam transverse to the direction of movement of the surface relative to the beam at a frequency which is a multiple of the frequency of the signal to be recorded; and intensity modulating means operatively associated with the beam for modulating the intensity of the beam with the signal to be recorded and with a signal at a frequency which is double the deflection frequency and which has a phase such that the beam intensity varies between maximum and minimum extreme values and has one of its extreme values along the center of the track and the other of its extreme values at the edges thereof.

* * * * *